3 Sheets—Sheet 1.

J. F. SEIBERLING.

Harvester.

No. 8,144. Reissued March 26, 1878.

WITNESSES

Alex Mahon

John G. Carter

INVENTOR

J. F. Seiberling by A. M. Smith

ATTORNEY

N. PETERS, PHOTO-LITHOGRAPHER, WASHINGTON, D. C.

J. F. SEIBERLING.
Harvester.
No. 8,144. Reissued March 26, 1878.
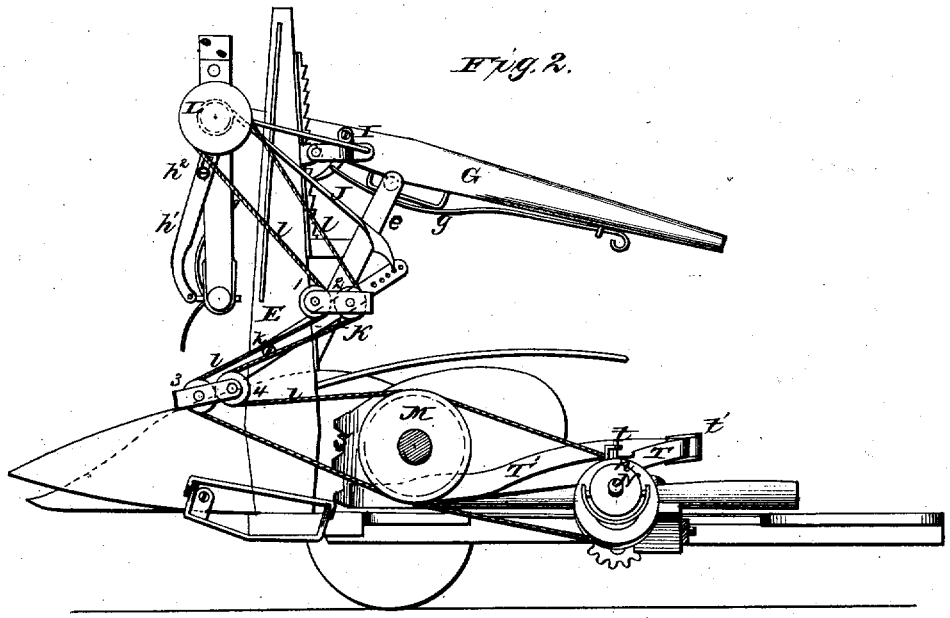
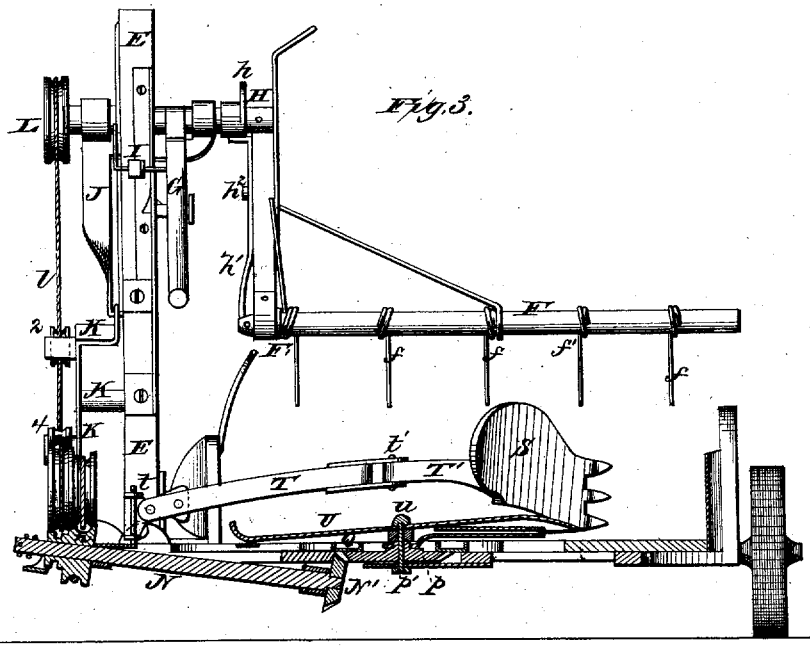
WITNESSES
John B. Carter
Alex Mahon
INVENTOR
J. F. Seiberling
by A. M. Smith
ATTORNEY
N. PETERS. PHOTO-LITHOGRAPHER, WASHINGTON, D. C.

J. F. SEIBERLING.

Harvester.

No. 8,144. Reissued March 26, 1878.

WITNESSES
John G. Center
Alex Mahon

INVENTOR
J. F. Seiberling
by A. M. Smith
ATTORNEY

N. PETERS, PHOTO-LITHOGRAPHER, WASHINGTON, D. C.

UNITED STATES PATENT OFFICE.

JOHN F. SEIBERLING, OF AKRON, OHIO.

IMPROVEMENT IN HARVESTERS.

Specification forming part of Letters Patent No. 135,013, dated January 21, 1873; Reissue No. 8,144, dated March 26, 1878; application filed January 25, 1878.

*To all whom it may concern:*

Be it known that I, JOHN F. SEIBERLING, of Akron, in the county of Summit and State of Ohio, have invented certain new and useful Improvements in Harvesters, of which the following is a specification, reference being had to the accompanying drawing, in which—

Figure 1:
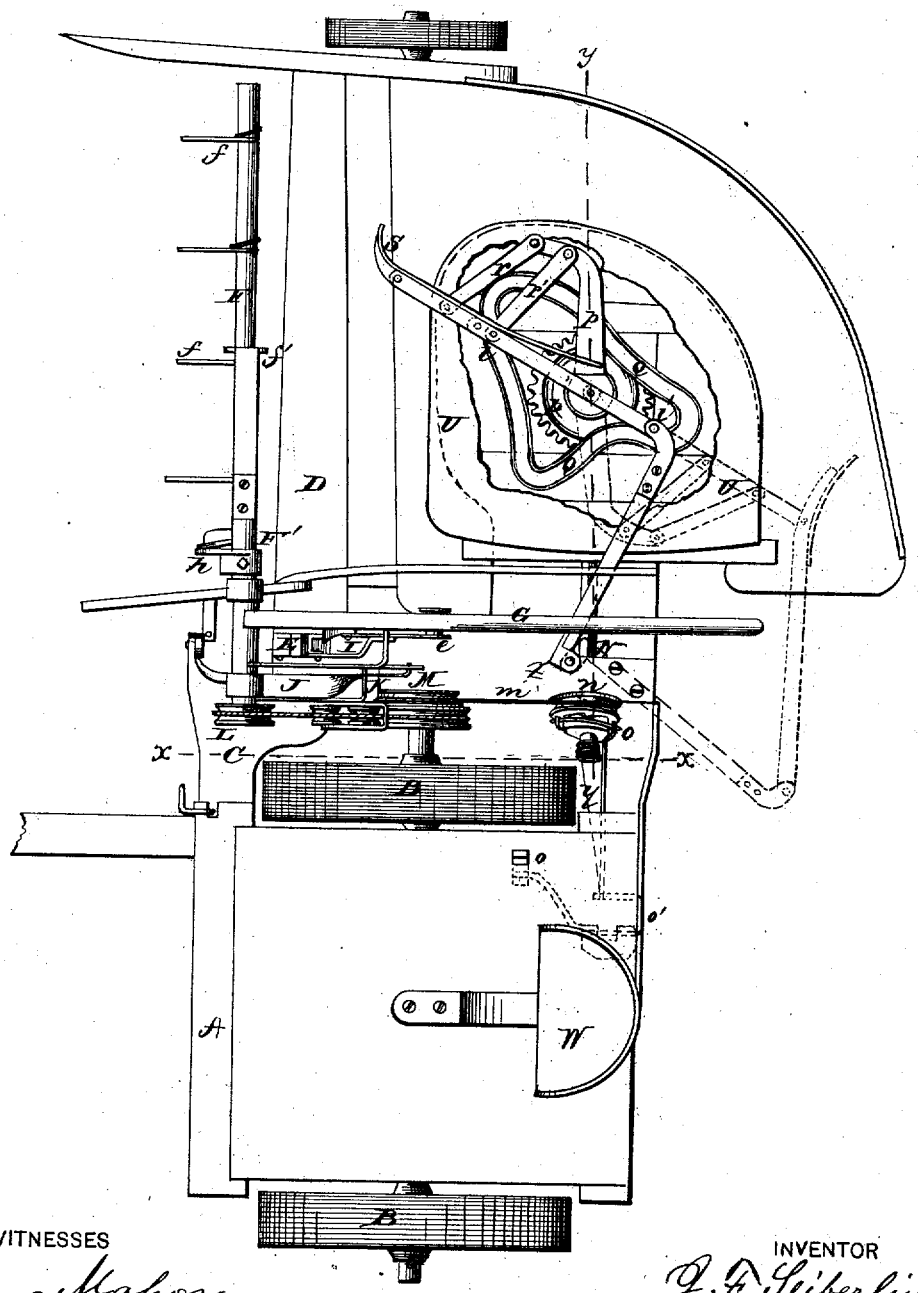
Figure 4:
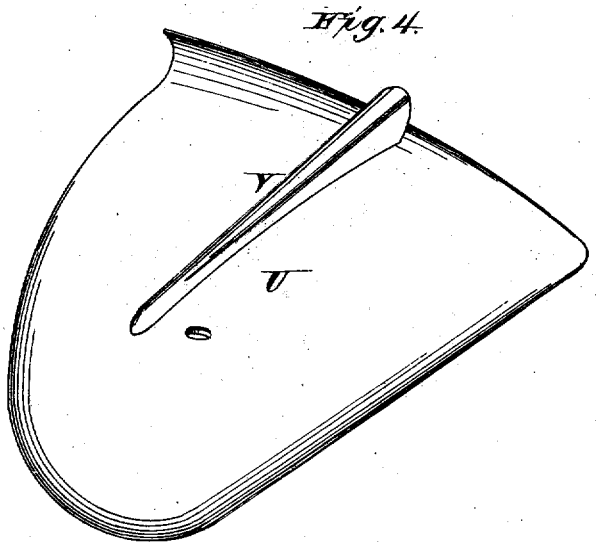
Figure 5:
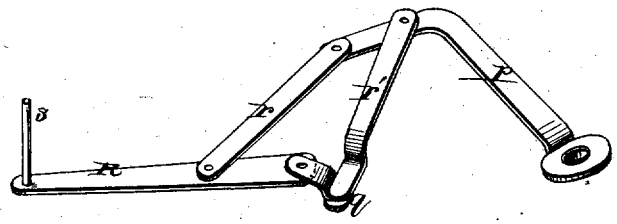

Figure 1 represents a plan view of so much of a harvester in which my improvements are embodied as is necessary to illustrate the subject-matter of my claims, the central portion of the platform being broken away to show the rake mechanism. Fig. 2 represents a side elevation of the machine, partly in section, through the line *x x* of Fig. 1, looking toward the driver. Fig. 3 represents a rear elevation of the parts shown in Fig. 2, in section, on the line *y y* of Fig. 1; Fig. 4, a perspective view of the platform-shield detached; and Fig. 5 represents a perspective view of the rake-arm detached.

In this instance my improvements are shown as adapted to the well-known "Excelsior Harvester," on which numerous patents have heretofore been granted to me. Obviously, however, some of these improvements might be used without the others, and they readily might be adapted to machines of a class or construction differing from that herein shown.

The invention relates, first, to an improvement in automatic rakes of that class in which the rake moves horizontally across the platform in a path parallel, or nearly so, with the finger-beam, compressing the grain into a gavel against the side board or fender of the platform preparatory to discharging the same.

It further relates to the combination, with a platform-rake of the class described, of an adjustable reel, controlled by the driver in his seat on the machine, whereby the driver is enabled readily to adjust the reel to prevent it from interfering with the compacted gavel under any of the varying conditions of the grain, and without impairing the efficiency of reel in gathering the grain in to the cutters.

It further relates to the arrangement of the jointed rake-stale, in the class of rakes described, in a front-cut hinged-bar machine, whereby said stale is adapted, when the rake is discharging a gavel, to swing over an unobstructed space behind the machine for permitting it to conform to the movements of, and to vibrate freely with, the hinged platform.

It further relates to the devices for enabling the driver to raise and lower the reel, constituting an improvement on the machine shown in my patent of August 1, 1871, No. 117,692; and it further relates to the devices for maintaining the tension of the reel-band while raising or lowering the reel.

The subject-matter claimed is hereinafter specified.

In the accompanying drawing a main frame, A, is shown as mounted on two wheels, B. A finger-beam, D, is pivoted to a coupling-frame, C, in turn pivoted to the main frame. A reel-post, E, is mounted on the finger-beam. The reel has spring-teeth *f* coiled around an oscillating rib, F, supported in bearings F′ *f′*.

A lever, G, is mounted on a sliding fulcrum, on an arm or bracket, *e*, projecting from the post, being retained in place by a loop, *g*. The reel-shaft is mounted in a pipe-box, H, which supports a cam, *h*, on a link, $h^1$, sliding on a fulcrum, $h^2$, on the reel-arm, and pivoted to the oscillating rake-arm. By this means the teeth are turned down at proper intervals, a spring next the rake-arm turning them up when free from the cam. A radius-link or guide-link, I, connects the lever G and the reel-post, being pivoted to each, and an ordinary rack and detent holds the reel in any desired position. A link, J, is pivoted at one end to the reel-bearing, and at the other to an arm, K, rocking on a central pivot, *k*, on the reel-post.

Tension-pulleys 1 2 3 4 are arranged in pairs in frames pivoted one at each end of this rocking lever. The chain *l*, which drives the reel, passes from a driving-pulley, M, on the main axle around these tension-pulleys, as shown in the drawing, and around the reel-pulley L.

This construction permits the reel, when the tension of the reel-belt has once been adjusted, to be raised or lowered without disturbing the tension, and this primary tension adjustment can be effected by means of a series of holes in the rocking lever, into which a catch on the link J takes, thus varying the radial distance of the tension-pulleys from the reel-axis at pleasure.

A sprocket-wheel, M, on the main axle drives a chain, *m*, encircling a pulley, *n*, on a shaft, N, mounted in bearings beneath the platform, and inclining upward and outward from its center, by which means the shaft is elevated out of the way of the discharged gavels. The pulley on this shaft is also by this means brought into the same horizontal plane as the driving-pulley, thus clearing obstructions as well as avoiding the tendency of the chain to lift the platform.

This shaft, it will be observed, has no connection with the main frame, except through the hinges of the coupling-frame, and is thus free to conform to all the movements of the platform. The shaft is thrown into or out of gear by means of a clutch, O, sliding on the shaft, and a feather on the pulley *n*, which turns loosely on the shaft N when disengaged.

The clutch is operated by a foot-lever, *o*, on the main frame, and a compound lever or link connection, *o'*. The driver is thus enabled at pleasure to stop and start the rake.

A bevel-wheel, N', drives a corresponding pinion, *p*, on a vertical shaft, *p'*, turning in proper bearings underneath the platform. This shaft carries a crank-arm, P, bent horizontally at its outer end to form an elbow, as shown in Fig. 1. Two links, *r r'*, are pivoted at one end to this elbow, and at the other to an arm, R, as shown in Fig. 5.

A friction-roller, *q*, on the under side of this arm, at its point of juncture with the link *r*, traverses an eccentric guide-cam, Q, (see Fig. 1,) underneath the platform. A pin, *s*, on the arm R enters a hole in the first joint of the rake-stale, which carries the rake-head S.

The inner end of the rake-stale swings on a pivot, *t*, mounted on the platform-frame near the line of the joints connecting said frame with the coupling frame or bars, at a point near the rear transverse line of the main frame and the rear face or periphery of the driving-wheel, and nearly equidistant from the front and rear of the platform, which projects in rear of the main frame, as shown, thus leaving an unobstructed space at the inner side of the platform and behind the main frame, over which space the rake-stale swings in discharging the gavels, as indicated in the dotted lines, Fig. 1, and in which space the rake-stale is free to vibrate in conforming to the movements of the hinged platform. The stale-arm T swings freely horizontally on its pivot *t* at one end, and at the other end is pivoted, by a hinge, *t*, to a second stale-arm, T', which carries the rake, as above set forth. The cam guide and gearing are so arranged that the arm R moves over the upper face of the platform; and to protect said arm and its actuating devices I cover the central portion of the platform with an elastic or flexible shield, U, between which and the platform the arm R travels, the connection between the arm and rake being made outside of the shield. A screw or bolt, *u*, passes down through this shield, and holds it securely in place. A rib, V, is arranged on this shield parallel with the finger-beam, inclining from the gearing toward the grain side thereof, for causing the grain to slide outward; and a guard or flange formed at the inner side of the shield by turning up the edge, as shown at *u'*, prevents the grain from escaping or being shaken off at that side, and thus interfering with the action of the rake and the delivery of the gavels in good shape.

W is the driver's seat, mounted on the main frame in rear of the drive-wheel axle, in convenient position for enabling the driver to observe the action of the reel and the condition of the grain, and to raise or depress the reel by means of the lever G, as may be required.

The operation of rakes of this class is well understood; but in mine the operation differs from others, owing to peculiarities in its construction and arrangement. My rake is pivoted on the gearing side of the platform and in advance of its rear edge. It enters the fallen grain just back of the inner divider, sweeps across the platform to the grain side thereof, gathering up the grain into a compact gavel, compressing it against the side board or fender, and then moves back in the arc of a circle, discharging the gavel behind the pivot of the rake, well out of the way of the team on the next round.

In this operation it will be seen that where the grain is light and lies up loosely after it has been first gathered up by the rake, and is bunched against the side board or fender of the platform, it would be liable to be struck and scattered by the reel-beaters, if the latter were not made adjustable and placed under the control of the driver in such manner that when necessary he can instantly raise the reel sufficiently to cause the beaters to clear the gavel until the latter has been withdrawn beyond their reach, after which, if desired, the reel can be again depressed into proper position for picking up the grain and presenting it to the action of the cutters.

It is well known that with the old style of reel, which has no quick adjustment, the reeling cannot be well done in a field of grain that is uneven in length, from the fact that a stationary reel will have to be set for the tallest grain in a field, at a height which will be too great for the low grain found in the same field, and this results in laying the short grain up loosely on the platform, the heads of the grain being up, and the butts down to the sickle, in a very bad condition for this style of a rake to gather, as the grain will have a tendency to slip forward over the sickle as the rake sweeps across the platform, and thus interfere with the uncut grain, and with the proper raking and delivering of the gavel. This difficulty is all obviated by the combination of an adjustable reel with rakes of this class, as the reel can be kept in the proper position for the different lengths of grain, and will lay the grain flat on the platform.

The inclined rib V aids the rake by causing the grain to slip over toward the divider end of the platform, where it lies directly in the path of the rake. The reel gathers the grain to the cutters; but its teeth, being elastic, yield to the rake as it sweeps across the platform, and thus prevents breakage. I am thus enabled effectively to operate upon long or short, lodged or straight, grain.

Having now described my invention, what I claim as new, and desire to secure by Letters Patent, is—

1. In combination with a rake that moves across the front of the platform, as described, and sweeps the grain to the ground by pressing the gavel against the side board or fender of the platform, an adjustable reel that can readily be operated by a lever from the driver's seat, substantially as described.

2. In combination with a front-cut hinge-joint machine and a quadrant-shaped platform, the jointed rake-stale hinged on the inner side of the platform, at or near midway of its length, whereby the rake-stale is adapted to swing in an unobstructed space behind the main frame, and to vibrate with the movements of the platform when the gavel is delivered, substantially as described.

3. The combination of a finger-beam arranged in front of the drive-wheel, a platform attached thereto, a rake that moves across the front end of the platform, as described, an adjustable reel operated by a lever, and the driver's seat located behind the main axle on the machine, substantially as described.

4. The combination of the jointed rake-stale, the rotating driving-arm P, the connecting-links *r r'*, pivoted to the driving-arm and stale, and the guide-cam, these members being constructed and operating in combination substantially as set forth, to impart the requisite movements to the rake.

5. The combination of the revolving rake-arm and the stationary elastic shield, constructed as set forth, between which and the platform the rake-arm traverses, which shield rises to allow the rake-arm to pass, and then sinks to prevent the mechanism from clogging.

6. The rake-guard *w'*, formed by turning up of the inner side of the shield, for the purpose set forth.

7. The combination of a supporting-fulcrum for the reel-supporting lever and the pivoted guiding-link connecting the reel-post and lever, substantially as and for the purpose set forth.

8. The centrally-pivoted rocking lever K, constructed substantially as set forth, with two sets of tension-pulleys pivoted thereon, and having an adjustable link-connection with the reel-support, for the purpose set forth.

9. The combination of the sprocket-wheel on the inner end of the main axle, the rake-driving chain and the sprocket-wheel on the inner end of the rake-driving shaft, which extends beneath the platform, the sprocket-pulley being in or near the line of the hinges of the platform, substantially as set forth.

JOHN F. SEIBERLING.

Witnesses:
J. F. STUVER,
HENRY GETZ.